(12) United States Patent
Burgess

(10) Patent No.: US 9,189,022 B2
(45) Date of Patent: Nov. 17, 2015

(54) WEARABLE GLOVE ELECTRONIC DEVICE

(71) Applicant: SYMBOL TECHNOLOGIES, INC., Schaumburg, IL (US)

(72) Inventor: William T Burgess, Holbrook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 71 days.

(21) Appl. No.: 14/079,074

(22) Filed: Nov. 13, 2013

(65) Prior Publication Data
US 2015/0130698 A1 May 14, 2015

(51) Int. Cl.
*G06F 1/16* (2006.01)
*A41D 19/00* (2006.01)
*G06F 3/01* (2006.01)

(52) U.S. Cl.
CPC ............ *G06F 1/163* (2013.01); *A41D 19/0024* (2013.01); *G06F 3/014* (2013.01)

(58) Field of Classification Search
CPC ................................. G06F 3/014; G06F 1/163
USPC ................... 345/156–158, 173–179; 362/103
See application file for complete search history.

(56) References Cited

U.S. PATENT DOCUMENTS

| | | | |
|---|---|---|---|
| 5,148,002 A * | 9/1992 | Kuo et al. ...................... 219/211 |
| 5,514,861 A | 5/1996 | Swartz et al. | |
| 5,796,354 A | 8/1998 | Cartabiano et al. | |
| 5,881,384 A | 3/1999 | Williams | |
| 6,049,327 A * | 4/2000 | Walker et al. .................. 345/158 |
| 6,088,017 A * | 7/2000 | Tremblay et al. .............. 345/156 |
| 6,234,393 B1 | 5/2001 | Paratore et al. | |
| 6,380,923 B1 | 4/2002 | Fukumoto et al. | |
| 6,619,835 B2 * | 9/2003 | Kita ............................... 368/281 |
| 7,042,438 B2 | 5/2006 | McRae et al. | |
| 7,084,884 B1 * | 8/2006 | Nelson et al. .................. 345/619 |
| 7,148,879 B2 * | 12/2006 | Amento et al. ................ 345/158 |
| 7,618,260 B2 * | 11/2009 | Daniel et al. ...................... 439/37 |
| 7,753,845 B2 | 7/2010 | Gopinathan et al. | |
| 7,862,522 B1 * | 1/2011 | Barclay et al. ................. 600/595 |
| 8,199,104 B2 | 6/2012 | Park et al. | |
| 8,279,091 B1 | 10/2012 | Tran et al. | |
| 8,471,868 B1 | 6/2013 | Wilson et al. | |
| 8,508,472 B1 | 8/2013 | Wieder | |
| 8,947,382 B2 * | 2/2015 | Winkler et al. ................ 345/173 |
| 2002/0009972 A1 * | 1/2002 | Amento et al. .................. 455/66 |
| 2002/0194668 A1 * | 12/2002 | Kwon ............................. 2/161.4 |

(Continued)

FOREIGN PATENT DOCUMENTS

AU    2004227423 B2    9/2007
AU    2004303361 B2    4/2009

(Continued)

*Primary Examiner* — Md Saiful A Siddiqui

(57) ABSTRACT

A glove electronic device includes a plurality of peripherals, each of which is affixed to an adhesive cover and attachable to a location in at least one of finger portions, a wrist portion and a hand portion of the glove electronic device. Configuration of the plurality of peripherals on the glove electronic device is adaptable during use of the glove electronic device. The device also includes a transceiver for sending information captured by one or more of the plurality of peripherals and for transmitting information to one or more of the plurality of peripherals. The device further includes a processor configured to operate one or more of the plurality of peripherals responsive to a movement associated with the glove electronic device or body signals being sensed from sensors attached or worn on the body.

17 Claims, 3 Drawing Sheets

(56) References Cited

U.S. PATENT DOCUMENTS

| | | |
|---|---|---|
| 2005/0009584 A1* | 1/2005 | Park et al. .................. 455/575.6 |
| 2005/0231471 A1 | 10/2005 | Mallard |
| 2005/0264523 A1* | 12/2005 | Yoshida et al. ............... 345/156 |
| 2008/0093459 A1 | 4/2008 | Lapstun et al. |
| 2008/0189827 A1* | 8/2008 | Bauer ........................... 2/161.2 |
| 2009/0121026 A1 | 5/2009 | Druker et al. |
| 2009/0212979 A1* | 8/2009 | Catchings et al. .............. 341/20 |
| 2009/0222973 A1* | 9/2009 | Merkle et al. .................. 2/161.6 |
| 2010/0090949 A1 | 4/2010 | Tianqiao et al. |
| 2010/0097195 A1* | 4/2010 | Majoros et al. ............. 340/10.6 |
| 2010/0231505 A1 | 9/2010 | Iwata |
| 2010/0234695 A1 | 9/2010 | Morris |
| 2011/0258752 A1* | 10/2011 | Matheney et al. ................ 2/160 |
| 2012/0069552 A1* | 3/2012 | Richter ......................... 362/103 |
| 2012/0089054 A1 | 4/2012 | Centen et al. |
| 2012/0187192 A1 | 7/2012 | Lee |
| 2012/0209560 A1 | 8/2012 | Young |
| 2012/0295739 A1 | 11/2012 | Young |
| 2012/0318985 A1* | 12/2012 | Bushee ......................... 250/342 |
| 2013/0169420 A1* | 7/2013 | Blount, Jr. .................... 340/12.5 |
| 2013/0200819 A1 | 8/2013 | Valenti |
| 2013/0314902 A1* | 11/2013 | Bushee ......................... 362/103 |

FOREIGN PATENT DOCUMENTS

| | | | |
|---|---|---|---|
| AU | 2007209825 B2 | | 5/2010 |
| GB | 2422527 A2 | | 8/2006 |
| WO | WO 2011/108185 | * | 4/2011 |
| WO | 2013011336 A2 | | 1/2013 |

* cited by examiner

WEARABLE GLOVE ELECTRONIC DEVICE

BACKGROUND OF THE INVENTION

Wearable computers are typically miniature electronic devices worn by a user. These devices enable interactions with users and capture data based on user interactions and movements. However, the information processed by wearable computers or other types of computers is typically unrelated to the ordinary movements of a hand performing a task. Consider an example where a delivery driver has to process address information on a package. A computer/scanner may be used to scan the address separate from hand movements, such as lifting of the package. Accordingly, the delivery person must perform separate actions to, for example, move the package and scan the package. In order to increase productivity and reduce the time associated with performing certain tasks, it is desirable to provide a computing device that takes into account hand movements.

Accordingly, there is a need for a wearable glove electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
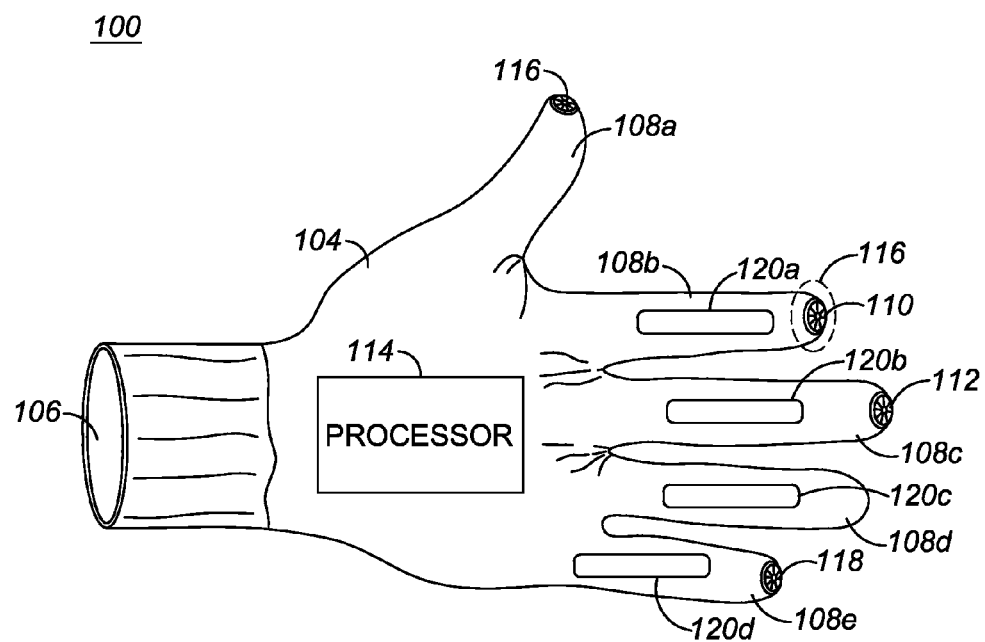
FIG. 1 is a block diagram of a glove electronic device used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for processing information based on movements of a glove electronic device. The glove electronic device includes a plurality of peripherals, each of which is affixed to an adhesive cover and attachable to a location in at least one of finger portions, a wrist portion and a hand portion of the glove electronic device. Configuration of the plurality of peripherals on the glove electronic device is adaptable during use of the glove electronic device. The device also includes a transceiver for sending information captured by one or more of the plurality of peripherals and for transmitting information to one or more of the plurality of peripherals. The device further includes a processor configured to operate one or more of the plurality of peripherals responsive to a movement associated with the glove electronic device.

FIG. 1 is a block diagram of a glove device used in accordance with some embodiments. Glove device 100 (also referred to as a glove electronic device) may include a hand portion 104, a wrist portion 106 and finger portions 108 (i.e., 108a-108e), such that glove device 100 may be configured in the shape of a hand. Glove device 100 may be made out of materials, for example, plastic, capable of housing one or more electronic components. The electronic components of glove device 100 may include a communications unit (not shown) coupled to a processing unit (also referred to simply as a processor) 114. Glove device 100 may also include one or more peripherals, each of which is configured to detect, receive, and/or transmit data based on movements of glove device 100. The configuration of one or more of the peripherals in glove device 100 may be adaptable based on use of glove device 100. In an embodiment, one or more of the peripherals may be added to or removed from glove device 100 using, for example, removable skin. For example, each peripheral may be affixed to an adhesive cover (also referred to as a removable skin) that can be attached to a section of glove device 100. The removable skin to which each peripheral is affixed may be attached and reattached to the same or different section of glove device 100 during use of glove device 100. Therefore, the configuration of the peripherals on the glove electronic device is adaptable during use of the glove electronic device 100.

Non-limiting examples of peripherals that may be included in glove device 100 may be a sensing computer 110 configured to detect environmental conditions, a radio frequency identifier (RFID) reader 112 configured to scan RFID tags, a recording device (not shown) such as a camera, one or more sensors 120 (i.e., 120a-102d), one or more active emitters 116 and/or a lighting source 118, each coupled to be in communication with processing unit 114 and capable of being activated by processing unit 114 or another source. Glove device 100 may also include an input unit (e.g., keypad, pointing device, etc.), an output transducer unit (e.g., speaker), an input transducer unit (e.g., a microphone) (MIC), and a display screen, each coupled to be in communication with the processing unit 114 and capable of being activated by processing unit 114 or another source. The speaker/microphone configuration may be configured with Push-To-Talk capability, Voice over IP (VoIP) capability or may be configured to perform other telephony related tasks. It should be noted that the placements of the components on glove device 100 as shown in the figures are only illustrative.

The communications unit may include a radio frequency (RF) interface configurable to communicate with network components, and other user equipment within its communication range. The communications unit may include one or more broadband and/or narrowband transceivers, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a Worldwide Interoperability for Microwave Access (WiMAX) transceiver perhaps operating in accordance with an IEEE 802.16 standard, and/or other similar type of wireless transceiver configurable to communicate via a wireless network for infrastructure communications. The communications unit may also include one or more local area network or personal area network transceivers such as wireless local area network transceiver perhaps operating in accordance with an IEEE 802.11 standard (e.g., 802.11a, 802.11b, 802.11g), or a Bluetooth transceiver. For any IEEE standards recited herein, contact the IEEE at IEEE, 445 Hoes Lane, PO Box 1331, Piscataway, N.J. 08855-1331, USA.

Processing unit 114 may include an encoder/decoder for encoding and decoding voice, data, control, or other signals that may be transmitted or received by glove device 100. Processing unit 114 may further include a digital signal processor (DSP) coupled to the speaker and the microphone for operating on audio signals received by glove device 100. Processing unit 114 may also include a character read-only memory (ROM) for storing code for decoding or encoding data such as control, request, or instruction messages, channel change messages, and/or data or voice messages that may be transmitted or received by glove device 100. Processing unit 114 may also be communicatively coupled to a static memory 124 configured store operating code associated with processor 114.

Processing unit 114 may further include or be communicatively coupled to a tracking module for tracking glove device 100. For instance, processing unit 114 may further include or be communicatively coupled to a satellite-based tracking sensor such as global positioning system (GPS) sensor, dead-reckoning sensor, indoor sensor nodes, wireless triangulation sensor, accelerometer-based positioning sensor and/or a radar detector . Processing unit 114 may also be connected to a power system including, for example, a battery, solar panel(s) and/or inductive charging components installed on knuckle plates on one or more of the finger portions 108, on the wrist portion of glove device 106, or back of the hand portion 104 of glove device 100.

Figure 2:
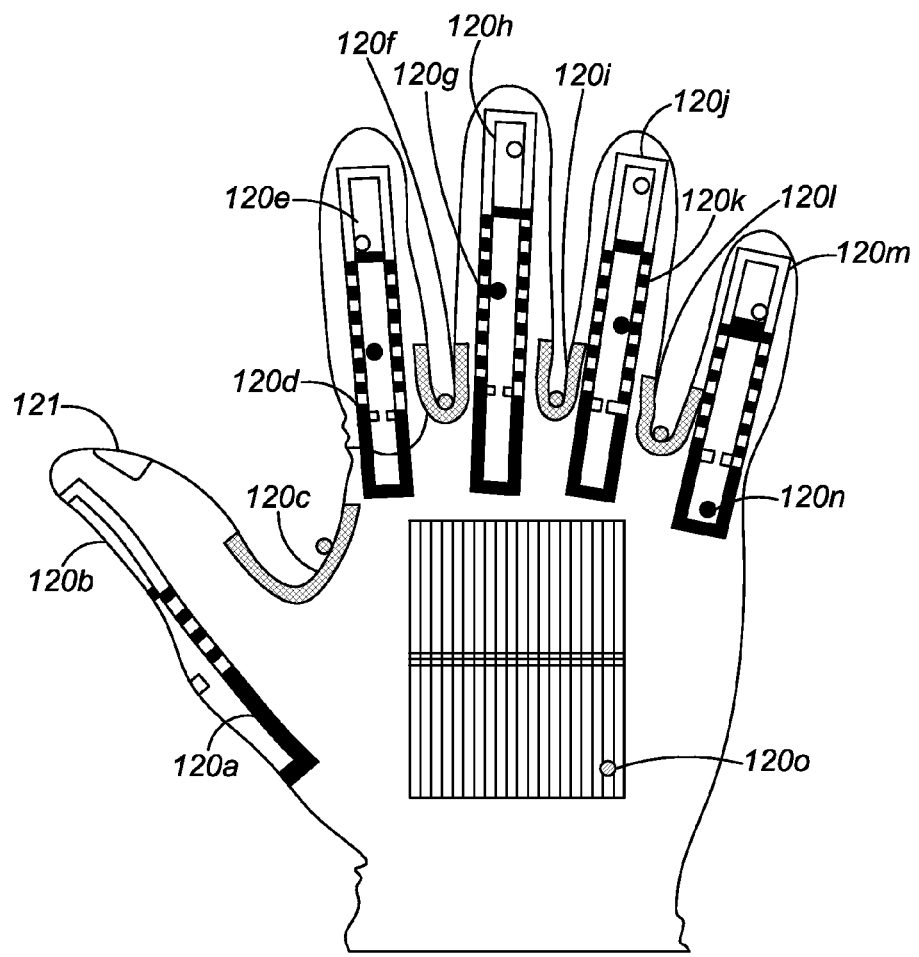
FIG. 2 further illustrates the sensors used on the glove electronic device in accordance with some embodiments.

FIG. 2 further illustrates the sensors used on the glove device in accordance with some embodiments. FIG. 2 shows that the finger portions of glove device 100 may include other sensors in addition to sensors 120a-120d shown in FIG. 1. It should be noted that the positions of sensors 120a-102d on glove device 100 is different in FIG. 1 and FIG. 2 to illustrate that the position each of the sensors may be changed, depending on use of the glove electronic device 100. In FIG. 2, the thumb portion of glove device 100 includes a reading sensor 121 (also referred to as an identity reader) for reading identifying information such as a fingerprint or other identifying information associated with a user. Sensor 121 may be used, for example, in security applications to verify a user identity. Each finger portion of glove device 100 also includes two sensors (i.e., 120a-120n), although any number of sensors may be included in one or more of the finger portions of glove device 100. One or more sensors may also be affixed to other sections of glove device 100 as shown, for example, with sensor 120o which is affixed to processor 114. Sensors 120 and 121 may be flexible sensors that can be manipulated to conform to various shapes and so that sensors 120 and 121 can be incorporated into one or more sections of glove device 100. Depending on the application, one or more of sensors 120 and 121 may be added to or removed from glove device 100 during use of glove device 100. Accordingly, the configuration of one or more of sensors 120 and 121 in glove device may be adaptable based on use of glove device 100. For example, each of sensors 120 and 121 may be affixed to a removable skin that can be attached and reattached to the same or different section of glove device 100 during use of glove device 100. Each of sensors 120 and 121 may be activated by processing unit 114 in order for the activated sensor to detect, receive, and/or transmit data based on movements of glove device 100.

When activated, a sensing computer is configured to detect environmental information, for example, the ambient temperature, air quality, the smell of alcohol, or gases based on information provided by one or more sensor 120. Sensors 120 may include a precision gas sensor that may be used, for example, in detecting air quality, breath analysis, carbon monoxide monitoring, or alcohol testing; a reducing gas sensor that may be used, for example, in methane, propane, or natural gas detection; an oxidizing gas sensor that may be used, for example, in ozone and in chlorine leaks detection; a non-contact thermometer that may be used, for example, in non-contact thermometry, thermal leak detection, energy audits and/or energy diagnostics; a humidity sensor that may be used, for example, in weather or heat index detection or used in incubators, storage or refrigerator crispers; a temperature sensor that may be used in a variety of ambient temperature monitoring applications; a light sensor that may be used in solar monitoring, indoor lighting, light intensity; a color sensor that may be used in automation projects, pattern recognition, color meter, or color analysis; a pressure sensor that may be used, for example, in detecting chamber pressure; a proximity sensor; a card reader and/or an expansion connector.

In addition to the sensors, referring to FIG. 1, glove device 100 may include the sensing computer 110 and RFID reader 112 configured to read RFID tags and/or 1-dimensional or 2-dimensional barcodes. Glove device 100 may also include lighting source 118 that may be used to create characters or signs depending on movements associated with glove device 110. The lighting source 118 may be, for example, LED lights that may be used to create predefined signs or symbols when certain gestures are made using glove device 100. For example, lighting source 118 may create a stop sign in the palm section of glove device when glove device is raised as shown in FIG. 2. Lighting source 114 may also be used to outline information being inputted to glove device 100. For instance, lighting source 118 may be operatively coupled with the speaker/microphone configuration such that a call may be made when a button (not shown) on glove device 100 is activated. To dial a number, gestures in the form of numbers may be made with movements of one or more of the finger portions 108 of glove device 100 and lighting source 118 may display or outline information associated with the movements of glove device 100. For example, lighting source may display information on a surface such as the ground, a table or in the air. In addition to displaying the information, lighting source 118 may transmit the information to processing unit 114. Accordingly, when the button associated with the speaker/microphone configuration is activated, lighting source 118 may outline the numbers to be dialed, for example, the numbers "911" created with gestures from a finger portion 108 of the glove device 100. In addition to outlining the information, lighting source 118 may transmit the information to one or more components of glove device 100 for further processing. For instance, lighting source 118 may submit the outlined numbers to processing unit 114 or to a communicatively coupled communication device in order for the device to dial "911".

One or more emitters 116 may be configured to share data collected by one or more sensors 120 and 121 or other components of glove device 100 via, for example, wireless pairing contact. For example, emitters 116 may transmit data from glove device 100 when the glove device 100 is paired with another device using, for example, Bluetooth protocol. Emitters 116 may also transmit data from glove device 100 when the glove device 100 is paired with a smart tag, Near Field Communication (NFC) tag or any wireless sticker with intelligence. In some embodiments, data from glove device 100 may be transmitted via a wired connection, such as a USB connection between glove device 100 and another device.

Glove device 100 may be paired with another electronic device being worn by the user of glove device 100. For example, glove device 100 may be paired with a headset being worn by the user of glove device by, for example, Bluetooth pairing between glove device 100 and the headset. A display screen (not shown) may be embedded in a region of the hand portion, for example, to show result from one or more of the peripherals.

When glove device 100 is powered on, processing unit 114 determines which sensors 120 and 121 and/or other peripherals are to be enabled and which sensors 120 and 121 and/or other peripherals are to be deactivated. Therefore, depending on the operating environment, processing unit may selectively activate or deactivate one or more peripherals. Subsequent to being powered on, glove device 100 may obtain data via the one or more activated peripherals based on movements of glove device 100. For example, an activated card reader sensor 120*f* may read credit card information when the credit card is passed between the index finger and the middle finger portions of glove device 100. In other examples, using one or more peripherals, glove device 100 may make phone calls, scan information, operate a flashlight, record audio, and/or generate symbols based on the movements associated one or more portions of glove device 100.

Consider an example where a police is wearing glove device 100 that includes an activated speed detecting sensor, a card reader, and one or more other sensors in the finger portions. The police may determine a driver's speed simply by placing his hand wearing glove device 100 in the direction of incoming traffic. The police may also read a driver's license simply by moving a reading sensor in glove device 100 over the license or by picking up the license with glove device 100. In potential harmful situations, this may enable the police to keep one hand on his weapon while retrieving vital information with glove device 100. Also, one or more activated sensors in glove device 100 may capture other environmental information, for example, the speed with which a weapon is fired, the ambient temperature, or the presence of a substance such as alcohol. Each of the activated sensors may send the captured speed to the processor 114 and/or display the speed on a display device. Therefore, the police may obtain necessary information with ordinary hand movements and without using additional processor such as radar guns.

In another example, glove device 100 may be used as a surgical tool that is capable of capturing key health metrics and that may be used in diagnosing certain diseases. Metrics for health could include, for example, blood pressure readings, respiratory rate, temperature, and precision of incisions. One or more of the sensors in glove device 100 may be used, for example, to sample blood and other human fluids and in drug testing. In an example, glove device 100 may be used by health care providers wherein a provider can perform a blood test by touching a blood sample collected in a vial and/or a sample on the body. This saves the time required to send a sample to the lab for testing. Subsequent to the sensors testing a sample, the testing results may be verified by the onboard processer 114 or may be transmitted to a remote processor for further processing. Glove device 100 may also be used to collect data from ongoing measurement of health states through a combination of wireless sensors, imaging technologies, and/or portable, non-invasive laboratory replacements. In yet another example, glove device 100 may be used in logistic and supply sectors such that sensors in glove device may, for example, obtain the weight of a package, the delivery and return addresses and tracking information by picking up the package with glove device 100 including one or more activated sensors.

Figure 3:
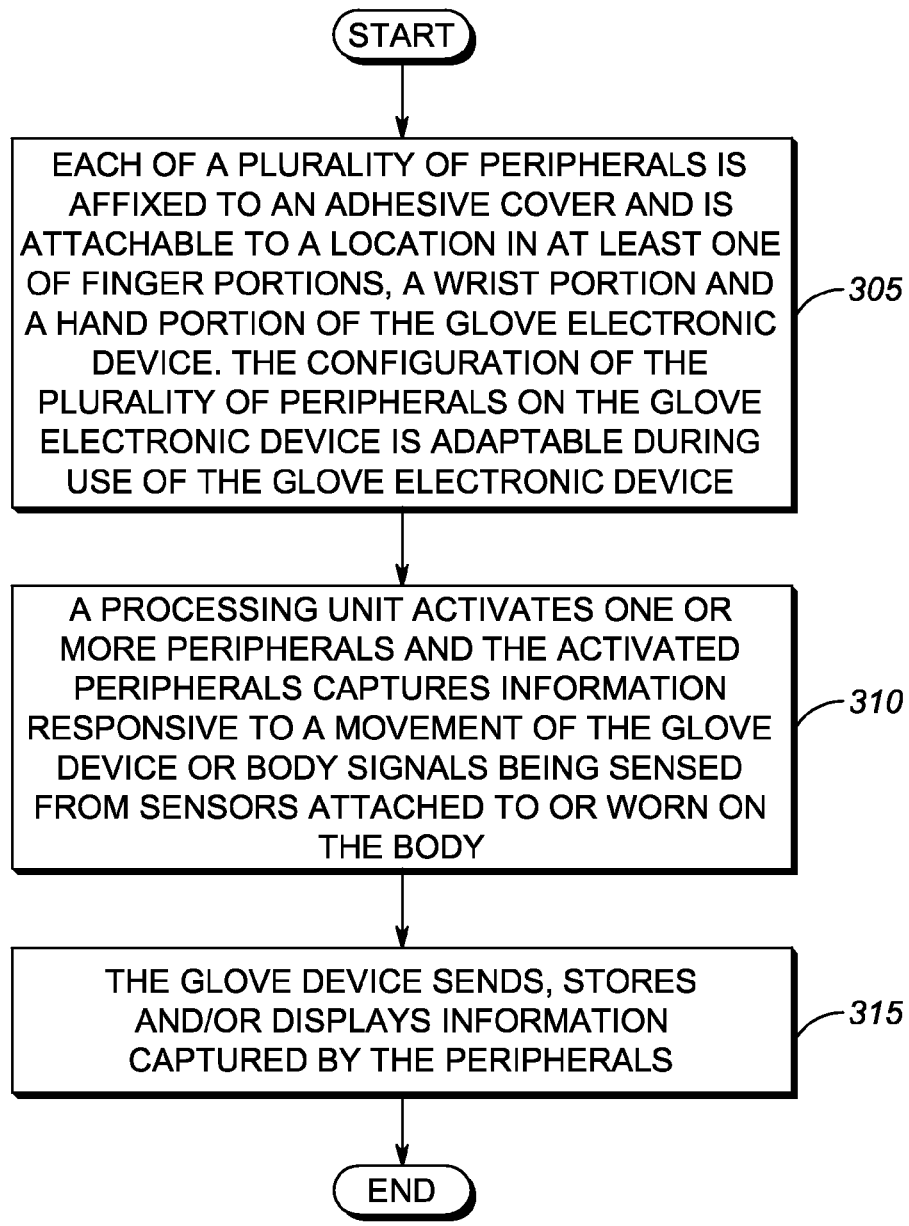
FIG. 3 is a flow diagram of operations used in accordance with some embodiments.

FIG. 3 is a flow diagram of the steps implemented in accordance with some embodiments. In 305, each of a plurality of peripherals is affixed to an adhesive cover and is attachable to a location in at least one of finger portions, a wrist portion and a hand portion of the glove electronic device. The configuration of the plurality of peripherals on the glove electronic device is adaptable during use of the glove electronic device. In 310, a processing unit activates one or more peripherals and the activated peripherals captures information responsive to a movement of the glove device or body signals being sensed from sensors attached to or worn on the body. In 315, the glove device sends, stores and/or displays information captured by the peripherals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A glove electronic device comprising:
a plurality of peripherals, each of which is affixed to an adhesive cover and attachable to a location in at least one of finger portions, a wrist portion and a hand portion of the glove electronic device, wherein each of the plurality of peripherals is configured to interact with an external environment, and wherein of the plurality of peripherals on the glove electronic device is adaptable from a first configuration to a second configuration during use of the glove electronic device;
a transceiver for sending information captured by one or more of the plurality of peripherals and for transmitting information to one or more of the plurality of peripherals; and
a processor configured to operate one or more of the plurality of peripherals responsive to a movement of the glove electronic device, wherein
the processor is further configured to activate and to deactivate each peripheral of the plurality of peripherals based on the external environment.

2. The glove electronic device of claim 1, further comprising a display screen for displaying information collected by one or more of the plurality of peripherals.

3. The glove electronic device of claim 1, wherein the plurality of peripherals includes at least one of a sensing computer and at least one sensor, wherein the sensing computer is configured to detect environmental information captured by the at least one sensor.

4. The glove electronic device of claim 1, wherein the plurality of peripherals includes at least one tracking module for providing at least one of location tracking and radar detection.

5. The glove electronic device of claim 1, wherein the plurality of peripherals includes at least one Radio Frequency Identifier (RFID) reader configured to read at least one of RFID tags and barcodes.

6. The glove electronic device of claim 1, wherein the transceiver includes at least one emitter configured to send data captured by at least one sensor responsive to the movement.

7. The glove electronic device of claim 1, wherein the plurality of peripherals includes at least one lighting source configured to create predefined signs or symbols responsive to at least one of the movement of the glove electronic device or a sensor input.

8. The glove electronic device of claim 1, wherein the plurality of peripherals includes at least one lighting source configured to outline information associated with at least one of the movement of the glove electronic device or a sensor input and to provide the outlined information to the glove electronic device for further processing.

9. The glove electronic device of claim 1, wherein the transceiver includes at least one emitter configured to transmit data from the glove electronic device when the glove electronic device is paired with another electronic device via a wireless protocol or a wired connection.

10. The glove electronic device of claim 1, wherein, during use of the glove electronic device, at least one of the plurality of peripherals is configured to be one of added to and removed from a section of the glove electronic device using a removable skin.

11. A method comprising:
activating, by a processor in a glove electronic device, a plurality of peripherals, each of which is affixed to an adhesive cover and attachable to a location in at least one of finger portions, a wrist portion and a hand portion of the glove electronic device, wherein each of the plurality of peripherals is configured to interact with an external environment, and wherein the plurality of peripherals on the glove electronic device is adaptable from a first configuration to a second configuration during use of the glove electronic device;
capturing, by one or more of the plurality of peripherals, information responsive to a movement of the glove electronic device; and
at least one of sending and displaying, by the glove electronic device, information captured by one or more of the plurality of peripherals, wherein
the method further comprising deactivating, by the processor, at least one peripheral of the plurality of peripherals based on the external environment.

12. The method of claim 11, wherein the plurality of peripherals includes at least one of a sensing computer and at least one sensor, wherein the method includes detecting environmental information, by the sensing computer, based on information captured by the at least one sensor.

13. The method of claim 11, further comprising providing at least one of location tracking and radar detection with at least one tracking module included in the plurality of peripherals.

14. The method of claim 11, further comprising reading at least one of Radio Frequency Identifier(RFID) tags and barcodes with an RFID reader included in the plurality of peripherals.

15. The method of claim 11, further comprising creating, by at least one lighting source included in the plurality of peripherals, predefined signs or symbols responsive to at least one of the movement of the glove electronic device or a sensor input.

16. The method of claim 11, further comprising outlining, by at least one lighting source included in the plurality of peripherals, information associated with at least one of the movement of the glove electronic device or a sensor input and providing the outlined information to the glove electronic device for further processing.

17. The method of claim 11, further comprising, during use of the glove electronic device, one of adding and removing at least one of the plurality of peripherals to and from a section of the glove electronic device using a removable skin.

* * * * *